/

US009407931B2

(12) United States Patent
Andersson et al.

(10) Patent No.: US 9,407,931 B2
(45) Date of Patent: Aug. 2, 2016

(54) MOTION VECTOR ESTIMATOR

(75) Inventors: Patrik Andersson, Lund (SE); Tomas Edsö, Lund (SE)

(73) Assignee: ARM Limited, Cambridge (GB)

( * ) Notice: Subject to any disclaimer, the term of this patent is extended or adjusted under 35 U.S.C. 154(b) by 1474 days.

(21) Appl. No.: 12/801,789

(22) Filed: Jun. 25, 2010

(65) Prior Publication Data

US 2010/0329345 A1 Dec. 30, 2010

(30) Foreign Application Priority Data

Jun. 25, 2009 (GB) .................................. 0911050.3

(51) Int. Cl.
*H04N 7/12* (2006.01)
*H04N 19/567* (2014.01)
*H04N 19/53* (2014.01)

(52) U.S. Cl.
CPC ............. *H04N 19/567* (2014.11); *H04N 19/53* (2014.11)

(58) Field of Classification Search
USPC ........................................ 375/240.01, 240.16
See application file for complete search history.

(56) References Cited

U.S. PATENT DOCUMENTS

| 2002/0080874 | A1* | 6/2002 | Wilson ...................... 375/240.01 |
| 2004/0247204 | A1* | 12/2004 | Lim et al. ........................ 382/298 |
| 2005/0220190 | A1* | 10/2005 | Ha et al. .................... 375/240.16 |
| 2006/0222074 | A1* | 10/2006 | Zhang ...................... 375/240.16 |
| 2007/0019738 | A1 | 1/2007 | Huang |
| 2007/0110159 | A1 | 5/2007 | Wang et al. |
| 2007/0160288 | A1* | 7/2007 | Hoffman et al. .............. 382/168 |

FOREIGN PATENT DOCUMENTS

| CN | 1622635 | 6/2005 |
| CN | 1961582 A | 5/2007 |
| EP | 1617678 | 1/2006 |
| GB | 2471323 | 12/2010 |
| JP | 2004236023 | 8/2004 |
| JP | 2006197387 | 7/2006 |
| JP | 2007235333 | 9/2007 |
| JP | 2008079152 A | 3/2008 |
| JP | 2011010304 A | 1/2011 |

OTHER PUBLICATIONS

Search Report for UK 0911050.3, dated Sep. 22, 2009.
Nam et al., "A Fast Hierarchical Motion Vector Estimation Algorithm Using Mean Pyramid", IEEE Transactions on Circuits and Systems for Video Technology, vol. 5, No. 4, Aug. 1995.
English translation of Japanese Official Action and claims mailed Dec. 21, 2012 in Japanese Application No. 2010-143839.
English translation of Japanese Official Action (Information Sheet) dated Aug. 6, 2013 in Japanese Application No. 2010-143839.
Great Britain Examination Report dated Feb. 5, 2014 in Application No. GB 0911050.3.
English Translation of Chinese Office Action and Search Report dated Dec. 30, 2013 in Chinese Application No. 2010-10253443.3.

* cited by examiner

*Primary Examiner* — Tracy Li
(74) *Attorney, Agent, or Firm* — Nixon & Vanderhye P.C.

(57) ABSTRACT

A data processing apparatus is provided which is configured to receive a down-sampled source block and a down-sampled reference frame portion. The data processing apparatus comprises interpolation circuitry configured to interpolate between pixels of the down-sampled reference frame portion to generate a set of interpolated down-sampled reference frame blocks. Cost function calculation circuitry calculates a cost function value indicative of a difference between the down-sampled source block and each interpolated down-sampled reference frame block. Minimisation circuitry identifies the lowest cost function value and estimation motion vector generation circuitry generates an estimate motion vector independence thereon.

22 Claims, 12 Drawing Sheets

MOTION VECTOR ESTIMATOR

TECHNOLOGY OVERVIEW

This application claims priority to GB Application No. 0911050.3 filed Jun. 25, 2009, the entire contents of which are incorporated herein by reference.

The present invention is concerned with video encoding, and in particular to motion searching in video encoding in order to generate motion vectors.

BACKGROUND

Motion searching is an important part of contemporary video encoding, and is known to be a high bandwidth, memory intensive activity. Typically, block based motion estimation is carried out, in which a current frame is subdivided into blocks of pixels. Each of these blocks (also referred to herein as a source block) is then compared to a reference frame (which may for example be the preceding frame) to find a best-matching block therein. The displacement from the location of this best-matching block to the current source block defines a motion vector, which is used by the video encoder to encode the source block by reference to that best matching block, using the motion vector together with further information representing any residual difference between the blocks.

Due to the computational demands of motion searching, in particular the memory access bandwidth requirements, it is known to perform a motion search in more than one step, initially carrying out a rough search which identifies an approximate motion vector, followed by a more detailed search to refine the results of the rough search. In this context, it is known for the rough search to search discrete positions in the reference frame or search a down-sampled version of the reference frame. Down-sampling is the process of generating an image of lower resolution from a higher resolution image. Performing motion vector searching using down-sampled images has the advantage of reducing memory access bandwidth, but at the cost of lower accuracy in the motion search.

It is further known for motion searches to be carried out in more than two steps, in a multi-resolution motion search. For example in "A Fast Hierarchical Motion Vector Estimation Algorithm Using Mean Pyramid", Kwon Moon Nam et al, IEEE Trans. Circuits and Systems for Video Technology, Volume 5, pp. 344-351, April 1993, a multi-stage motion search is described in which the motion search is broken down into several stages of progressive resolutions.

Hence, although down-sampling can avoid the high bandwidth requirements of a full resolution search, it suffers from a degradation in motion vector estimation accuracy resulting from the lower resolution of the down-sampled search image. More severely, when the full resolution image contains high frequency detail, the loss of such high frequency components of the image can result in the calculation of a motion vector from the down-sampled image that is significantly different from that which would have been calculated from the full resolution image.

Hence, it would be desirable to provide an improved technique for motion vector estimation in a video encoder with improved accuracy, yet without the high bandwidth requirements of a full resolution search.

SUMMARY

Viewed from a first aspect, the present invention provides a data processing apparatus configured to receive a down-sampled source block generated from a source frame and to receive a down-sampled reference frame portion generated from a reference frame, said reference frame and said source frame being taken from a sequence of video frames, said data processing apparatus comprising:

interpolation circuitry configured to interpolate between pixels of said down-sampled reference frame portion to generate a set of interpolated down-sampled reference frame blocks;

cost function calculation circuitry configured to calculate a cost function value indicative of a difference between said down-sampled source block and each of said set of interpolated down-sampled reference frame blocks;

minimisation circuitry configured to select an interpolated down-sampled reference frame block which corresponds to a minimum of said cost function value; and estimate motion vector generation circuitry configured to generate an estimate motion vector in dependence on said interpolated down-sampled reference frame block selected by said minimisation circuitry.

According to the techniques of the present invention, the data processing apparatus receives a down-sampled source block and a down-sampled reference frame portion, in order to generate an estimate motion vector based on a comparison between the two. The inventors of the present invention realised that an improvement in the accuracy of the estimate motion vector generated could be attained, without resorting to fetching higher resolution images from memory and the memory bandwidth increase that would entail, by providing interpolation circuitry which uses the down-sampled reference frame portion to generate a set of interpolated down-sampled reference frame blocks.

Cost function calculation circuitry is provided, which calculates a cost function value indicating a difference between the down-sampled source block and each interpolated down-sampled reference frame block. Thus the data processing apparatus can not only calculate the cost function at integer pixel positions in the down-sampled reference frame, but also at interpolated positions between those integer pixel positions. As a result the minimisation circuitry, which is arranged to find that position of the down-sampled source block within the down-sampled reference frame portion which minimises the cost function value, can find a minimum of the cost function at a higher resolution than would be possible with reference to integer pixel positions in the down-sampled reference frame alone. The estimate motion vector then generated by the estimate motion vector generation circuitry can thus provide result motion vector generation circuitry with a more accurate starting point for a motion search at full resolution. The accuracy is particularly improved when the reference frame contains high frequency components that are liable to be smeared out by down-sampling.

Furthermore, the techniques of the present invention enable an improvement in the accuracy of the estimate motion vector, without increasing the memory access bandwidth requirement, since only down-sampled source and reference frame blocks are retrieved from memory to be locally stored.

The down-sampled source image and down-sampled reference image may have been previously generated and stored in memory, but in one embodiment the data processing apparatus further comprises down-sampling circuitry configured to generate said down-sampled source block and said down-sampled reference frame portion. Providing down-sampling circuitry allows down-sampled images to be generated for storage in memory as they are required.

In one embodiment the data processing apparatus further comprises motion vector generation circuitry configured to receive as an input said estimate motion vector and to generate from said source image and said reference image a result motion vector, said result motion vector being constrained to be within a predetermined range of said estimate motion vector. Provision of the estimate motion vector to the result motion vector generator allows the result motion vector generator to limit the area in which it performs a full resolution motion search, thus saving memory bandwidth and computational resource.

It is advantageous to select the set of interpolated down-sampled reference frame blocks such that a minimum of the cost function may be more rapidly found and in one embodiment said set of interpolated down-sampled reference frame blocks is determined with reference to a predetermined set of points in said down-sampled reference frame portion. This set of points may be specified in a number of ways, but in one embodiment said predetermined set of points are separated by half of a block width.

In another embodiment, said set of interpolated down-sampled reference frame blocks is determined with reference to a null motion vector. When performing video encoding it is common that a motion vector for a source block from a source frame will be found to have a motion vector that is close to a null motion vector, when that block has not (or hardly) moved with respect to the same block in the reference frame.

In yet another embodiment, said set of interpolated down-sampled reference frame blocks is determined with reference to at least one predetermined motion vector of at least one neighbouring source block. When performing video encoding it is common that a motion vector for a given block will be closely correlated with the motion vectors of neighbouring blocks, for example due to the movement of an object which is larger than the block size. In one embodiment this at least one predetermined motion vector is a predicted motion vector for said down-sampled source block. A predicted motion vector is typically generated for each source block as part of the video encoding process, based on the motion vectors of neighbouring blocks.

Although the data processing apparatus could operate in a single step, calculating the cost function value for a single set of interpolated down-sampled reference frame blocks, in one embodiment said cost function calculation circuitry and said minimisation circuitry are configured to iteratively select said set of interpolated down-sampled reference frame blocks to find a local minimum of said cost function value. This arrangement allows the data processing apparatus to home in on a minimum of the cost function, iteratively selecting the set of interpolated down-sampled reference frame blocks to follow the surface of the cost function to a local minimum.

In order for the motion searching to be efficiently performed, the down-sampled reference frame portion must naturally be larger than the down-sampled source block, but should not present too great an area in which to motion search, since this would be burdensome both in terms of computational resource and in terms of memory access bandwidth. Hence in one embodiment said down-sampled reference frame portion is approximately an order of magnitude larger than said down-sampled source block.

It will be appreciated that the down-sampled source block could be generated from a source frame in a number of ways and in one embodiment said down-sampled source block comprises a subset of pixels from said source image. Equivalently, in one embodiment said down-sampled reference frame portion comprises a subset of pixels from said reference image. These subsets could for example be every other pixel, every fourth pixel or similar.

In other embodiments said down-sampled source block comprises a filtered version of a block of said source image, which could for example be provided in that each pixel of said down-sampled source block is generated by averaging over a set of pixels of said source image. Taking the mean or median pixel value over a 2×2 or 4×4 set of pixels are such examples.

Similarly in other embodiments said down-sampled reference frame portion comprises a filtered version of a block of said reference image, which could for example be provided in that each pixel of said down-sampled reference frame portion is generated by averaging over a set of pixels of said reference image. Similarly, taking the mean or median pixel value over a 2×2 or 4×4 set of pixels are such examples.

The interpolation performed by the interpolation circuitry could be performed at a range of ratios, but in one embodiment said interpolation circuitry is configured to perform ¼ pixel interpolation.

Generally the estimate motion vector could take any length within a frame, but it is advantageous to strike a balance between the freedom for the motion vector to take any length and the computational resource required to search in a wider area and in one embodiment said estimate motion vector is constrained to have a maximum length of 64 pixels.

There are various ways in which the cost function value could be calculated, but in an advantageously simple embodiment said cost function value is calculated from a sum of absolute differences between pixels of said down-sampled source block and pixels of each of said set of interpolated down-sampled reference frame blocks.

This sum of absolute differences does not account for the cost of encoding a large motion vector and in one embodiment said cost function value further comprises a motion vector penalty value.

In other embodiments the cost function value is calculated based on one of a sum of absolute transformed difference (SAID) algorithm, a sum of square error (SSE) algorithm, a mean square error (MSE) algorithm, a mean absolute error (MAE) algorithm, and a mean absolute difference (MAD) algorithm.

Viewed from a second aspect, the present invention provides a method of generating an estimate motion vector comprising the steps of:

receiving a down-sampled source block generated from a source frame and receiving a down-sampled reference frame portion generated from a reference frame, said reference frame and said source frame being taken from a sequence of video frames;

interpolating between pixels of said down-sampled reference frame portion to generate a set of interpolated down-sampled reference frame blocks;

calculating a cost function value indicative of a difference between said down-sampled source block and each of said set of interpolated down-sampled reference frame blocks;

selecting an interpolated down-sampled reference frame block which corresponds to a minimum of said cost function value; and generating an estimate motion vector in dependence on said interpolated down-sampled reference frame block selected by said minimisation circuitry.

Viewed from a third aspect, the present invention provides a data processing apparatus configured to receive a down-sampled source block generated from a source frame and to receive a down-sampled reference frame portion generated from a reference frame, said reference frame and said source frame being taken from a sequence of video frames, said data processing apparatus comprising:

interpolation means for interpolating between pixels of said down-sampled reference frame portion to generate a set of interpolated down-sampled reference frame blocks;

cost function calculation means for calculating a cost function value indicative of a difference between said down-sampled source block and each of said set of interpolated down-sampled reference frame blocks;

minimisation means for selecting an interpolated down-sampled reference frame block which corresponds to a minimum of said cost function value; and estimate motion vector generation means for generating an estimate motion vector in dependence on said interpolated down-sampled reference frame block selected by said minimisation means.

The above, and other objects, features and advantages of this invention will be apparent from the following detailed description of illustrative embodiments which is to be read in connection with the accompanying drawings.

DESCRIPTION OF NON-LIMITING EXAMPLES EMBODIMENTS

Figure 1:
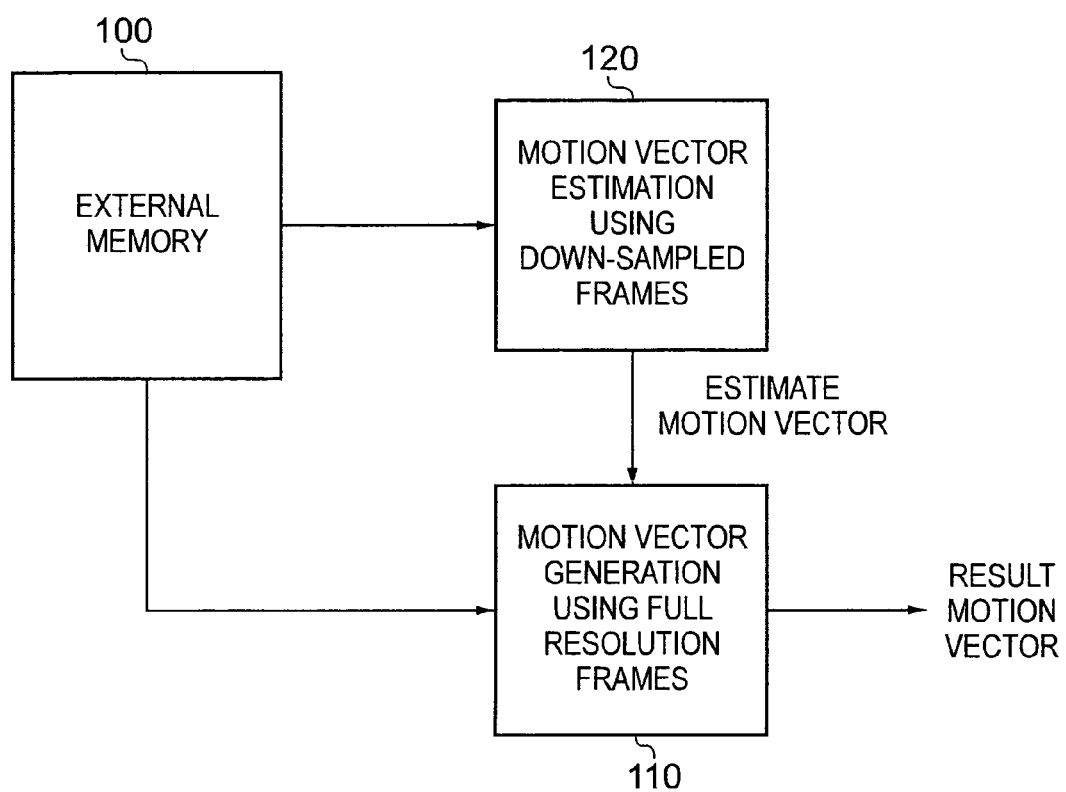
FIG. 1 schematically illustrates a system for generating a motion vector.

FIG. 1 schematically illustrates a system for generating motion vectors as part of a video encoding process. An external memory 100 stores frames of video data taken from a sequence of video frames which are to be encoded. Also stored within external memory 100 are down-sampled versions of those frames which are generated according to known techniques such as taking a subset of pixels from the original image (e.g. every fourth pixel) or by filtering the original image (e.g. by averaging over a set of 4×4 pixels). The full resolution frames stored in external memory 100 are passed to motion vector generation unit 110 which determines motion vectors for blocks within those frames. However, this process of motion vector generation using full resolution frames is computationally very expensive. For this reason, motion vector estimation unit 120 is provided which provides the motion vector generation unit 110 with an estimate motion vector which constrains the motion vector searching performed by the motion vector generation unit 110 to take place within a limited spatial region. The motion vector estimation unit 120 receives the down-sampled frames from external memory 100 and performs motion vector estimation in order to generate the estimate motion vector passed to motion vector generation unit 110.

The disadvantage of performing motion vector estimation using down-sampled frames is that high frequency elements of the original full resolution frames may be missed by this motion vector estimation process and hence the estimate motion vector passed to the motion vector generation unit 110 represents a poor starting place for the full resolution search. However, motion vector estimation unit 120 is arranged (as will be further described hereinafter) to interpolate between the pixels of the down-sampled frames and to perform motion vector estimation using those interpolated frames. This enables the motion vector estimation unit to maintain the low bandwidth advantages of only retrieving down-sampled frames from external memory 100, whilst improving on the resolution accessible in the down-sampled frames alone, and hence providing the motion vector generation unit 110 with an estimate motion vector which represents a more accurate starting position for performing the motion vector generation using full resolution frames.

Figure 2:
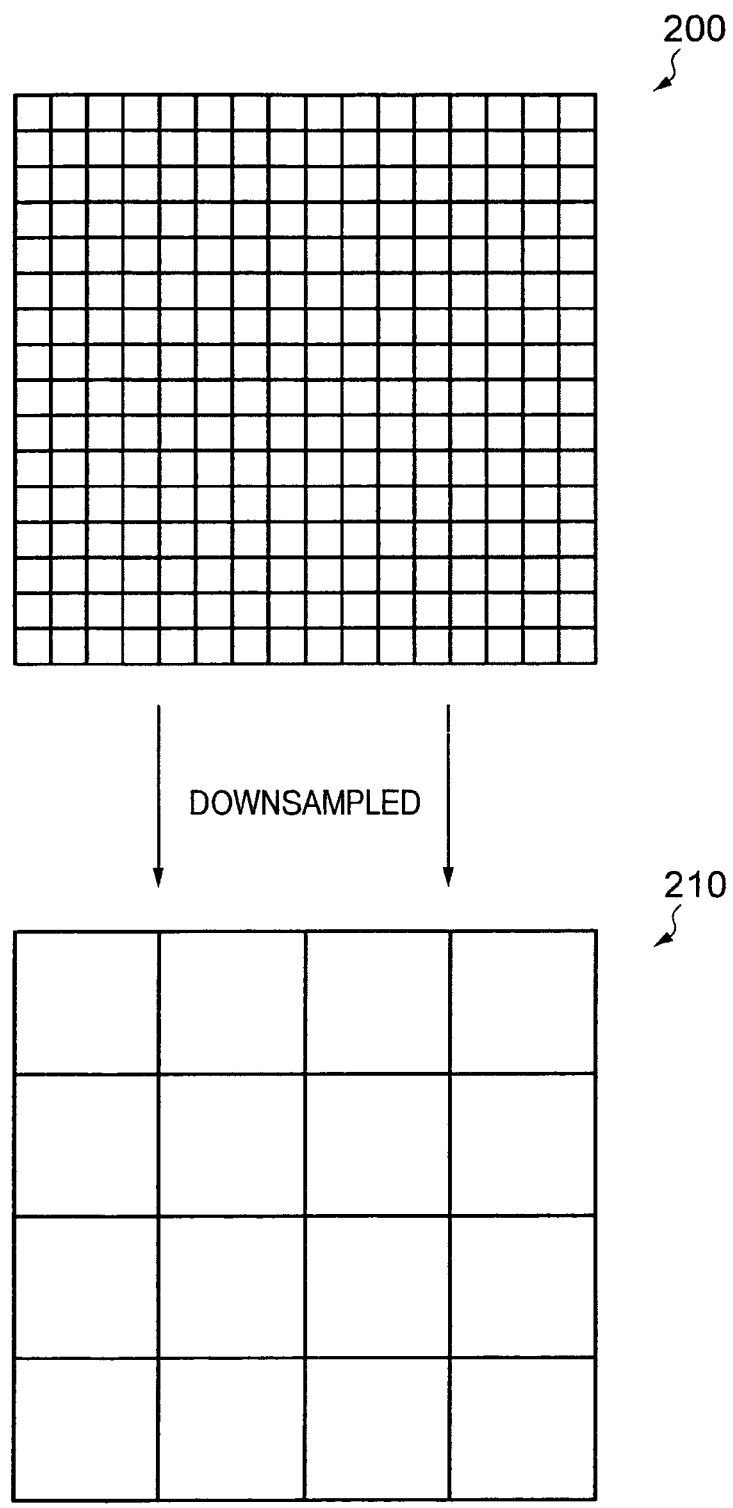
FIG. 2 schematically illustrates the down-sampling of a 16×16 block.

FIG. 2 schematically illustrates the process of down-sampling. Each full resolution frame is subdivided into macro blocks (also simply known as blocks) comprising 16×16 full resolution pixels as illustrated by grid 200. Once down-sampled such a block becomes a 4×4 set of down-sampled pixels as illustrated by grid 210. The process of down-sampling could be carried out in a number of ways, for example by taking a subset of the pixels in the full resolution frame, i.e. every fourth pixel (both horizontally and vertically) being taken from the 16×16 full resolution grid 200 to provide the 4×4 grid 210. However, in this illustrated embodiment the down-sampled block is generated by filtering the 16×16 full resolution grid 200, averaging over each 4×4 set of pixels to generate each down-sampled pixel of the 4×4 block 210.

Figure 3:
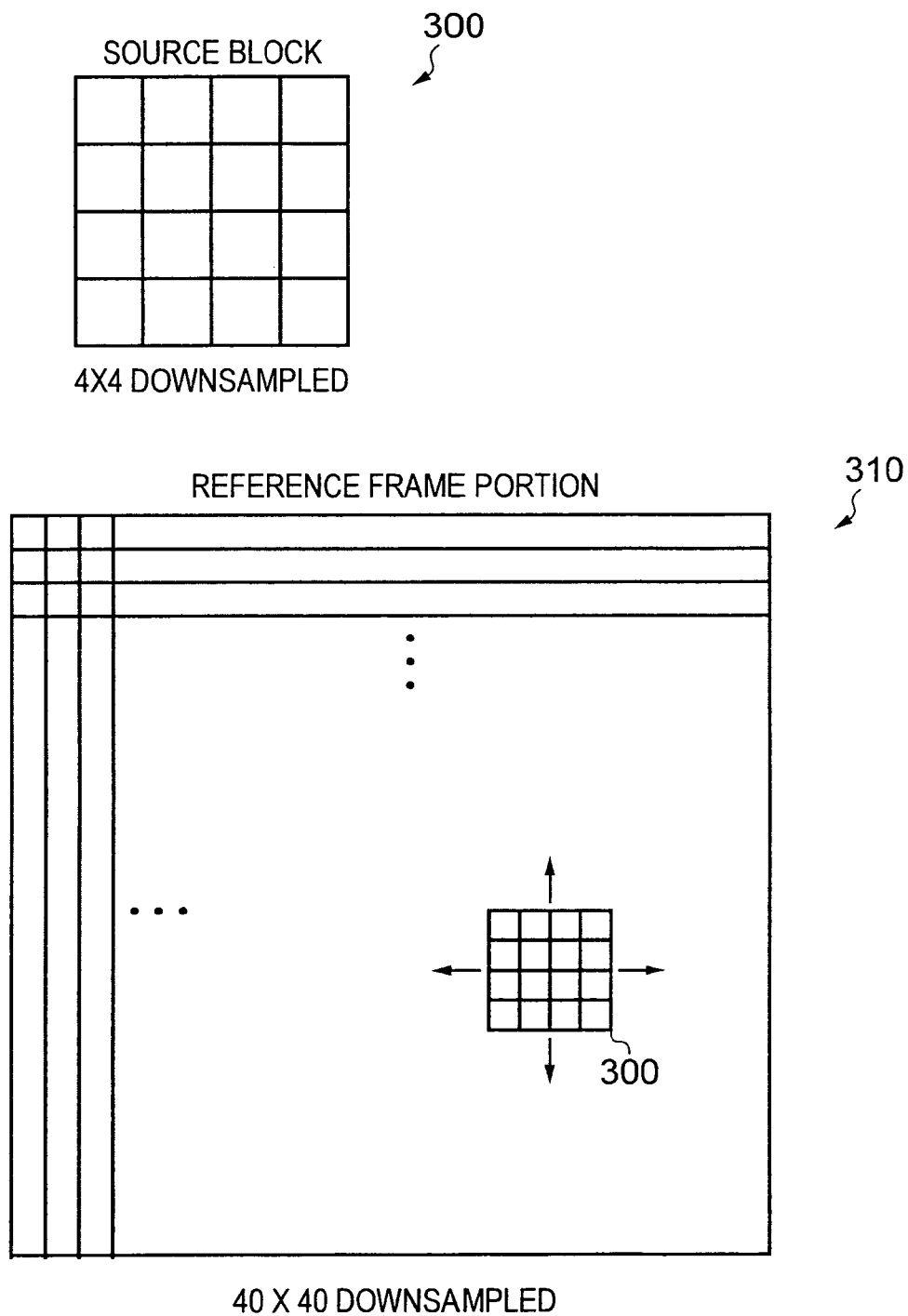
FIG. 3 schematically illustrates a down-sampled source block and a down-sampled reference frame portion.

The process of motion vector estimation is further explained with reference to FIG. 3, in which there is illustrated a 4×4 down-sampled source block 300 and a 40×40 down-sampled reference frame portion 310. In order to perform the video encoding each block of a current frame being encoded is in turn treated as the source block which is then compared to a reference frame to find the position in which the source block best fits with the reference frame. Whilst it would in principle be possible to search the entirety of a reference frame this is rather computationally intensive, in particular requiring more data to be retrieved from memory and stored locally, and in this embodiment only a portion of the reference frame is examined, namely a 40×40 (down-sampled) section thereof. A reference frame section of 40×40 down-sampled pixels is used, because this allows a more efficient search procedure to be carried out in which four source blocks in a 2×2 configuration are simultaneously processed. Adjacent source blocks will clearly require largely overlapping reference frames and for a 2×2 configuration of source blocks, a 40×40 reference frame provides a search window of ±64 full resolution pixels for each source block. Thus the motion vector estimation unit 120 in FIG. 1 retrieves each down-sampled source block 300 from external memory 100 and a down-sampled reference frame portion 310 from external memory 100, storing each in local buffers whilst the searching is performed.

Figure 4:
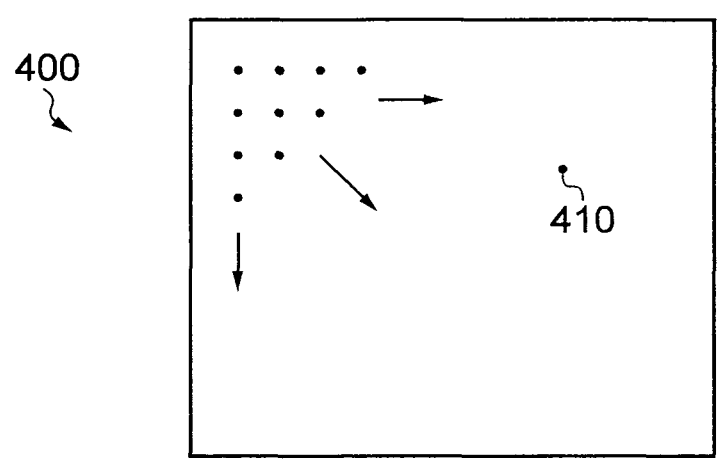
FIG. 4 schematically illustrates a predetermined set of points in a down-sampled reference frame portion.

Whilst the source block 300 could in principle be compared initially with all possible positions in reference portion 310, a less computationally intensive approach may be taken, which still produces satisfactory results, in which source block 300 is initially compared with a predetermined set of points in reference frame portion 310 as is schematically illustrated in FIG. 4. This set of points 400 are in this embodiment separated by half of a block width, i.e. at two downsampled pixel separation. This then provides a 16×16 set of points against which the source block 300 is compared in reference frame portion 310. Out of these points the point at which the source block best fits (an example is labelled 410 in FIG. 4) is then selected according to a cost function minimisation technique which will be further described hereinafter.

Figure 5:
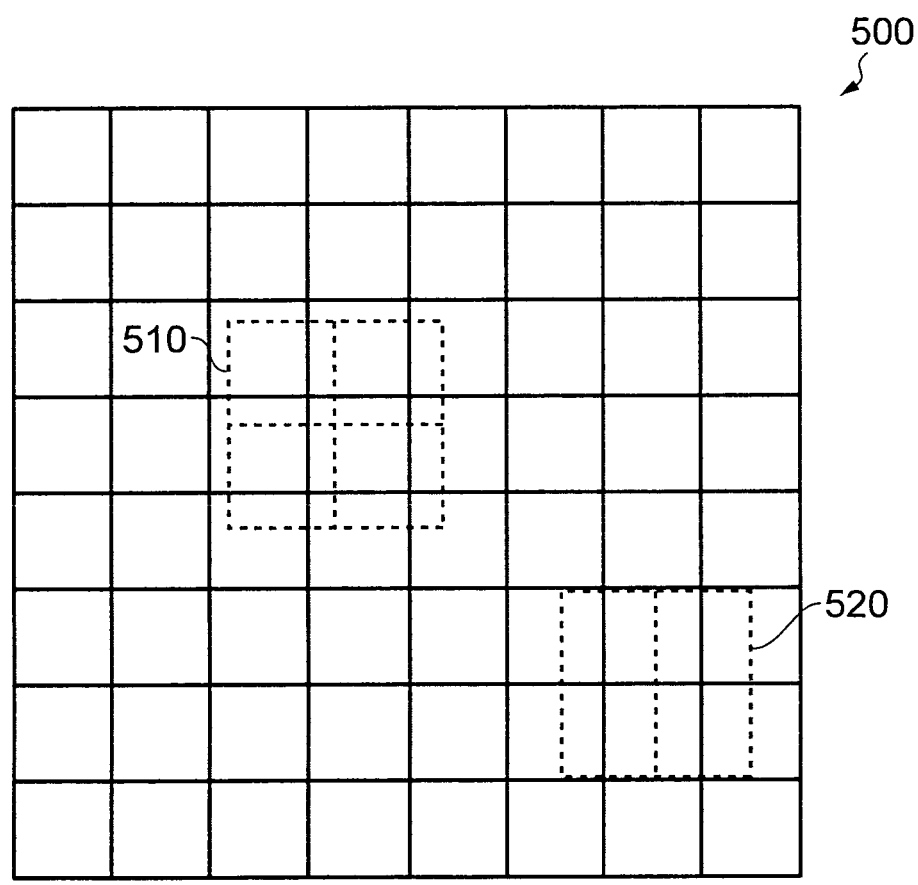
FIG. 5 schematically illustrates ¼ pixel interpolation.

FIG. 5 schematically illustrates the interpolation between down-sampled pixels of the down-sampled reference frame portion to generate interpolated down-sampled reference frame blocks to be compared with the down-sampled source block. (Note that for clarity of illustration only 2×2 interpolated blocks are illustrated in this figure.) Performing this interpolation means that the down-sampled source block can not only be compared with integer positions in the down-sampled reference frame portion 500 (of which only part is illustrated here), but also at interim positions between those integer positions. For example, the interpolated down-sampled reference frame block 510 is offset downwards and rightwards by a quarter down-sampled pixel from the integer down-sampled pixel positions of the down-sampled reference frame portion. As another example, the interpolated down-sampled reference frame block 520 is offset by half a down-sampled pixel to the right from the integer positions of the down-sampled reference frame portion. These offset positions may be generated by weighting the pixels according to their area of overlap with the integer position pixels. For example, each of the four pixels of the interpolated down-sampled reference frame block 520 derives 50% of its value from each of the two integer position pixels that it spans. On the other hand each pixel of the interpolated down-sampled reference frame block 510 comprise a 9/16 weighting from the pixel it mainly overlaps, 3/16 weightings from the immediately horizontally and vertically adjacent pixels, and 1/16 weighting from the pixel overlapped by its corner.

Figure 6:
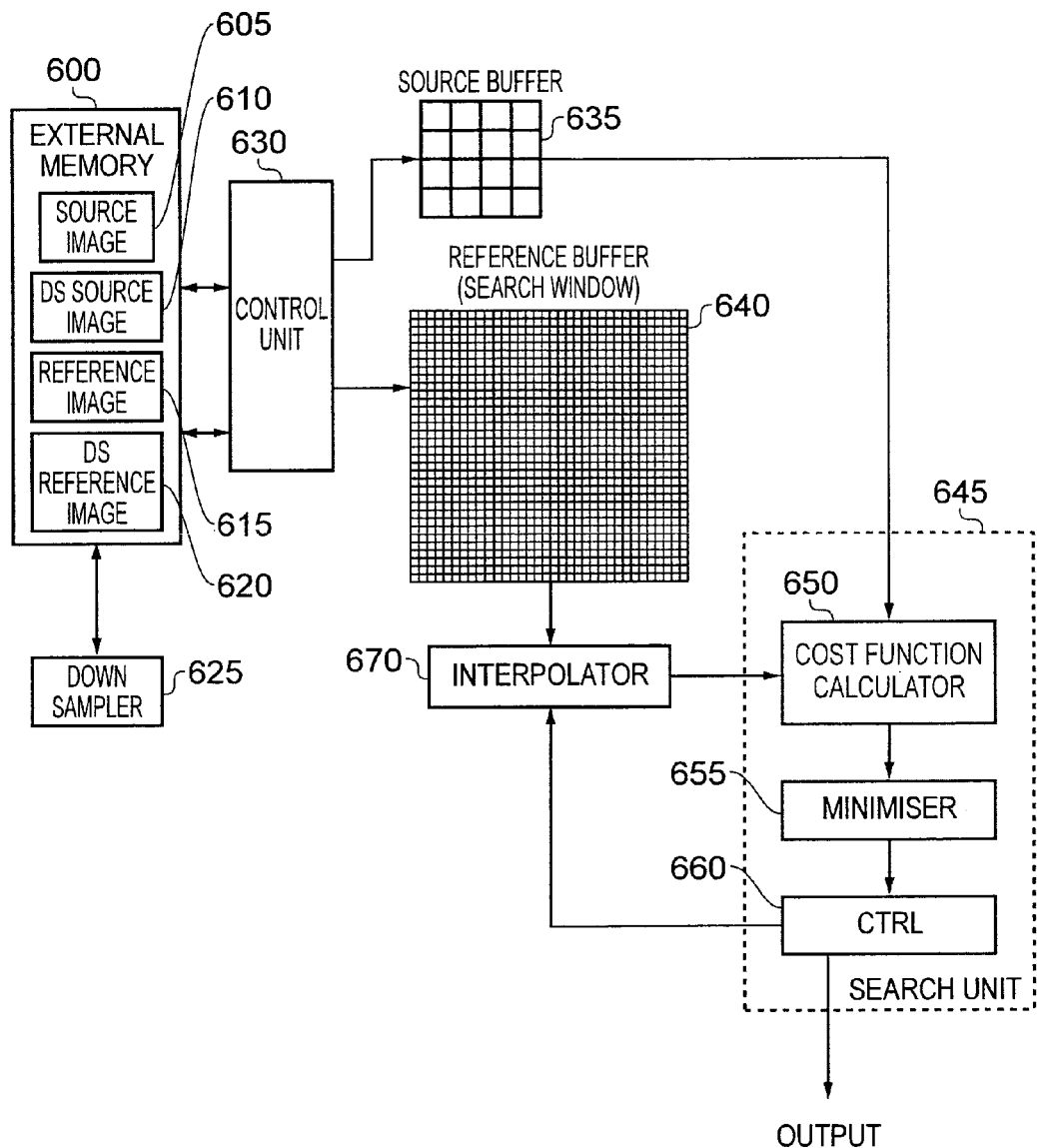
FIG. 6 schematically illustrates a data processing apparatus according to one embodiment.

FIG. 6 schematically illustrates a data processing apparatus according to one embodiment for generating a motion vector estimation in a video encoding system. External memory 600 stores images (video frames) for access by the remainder of the system. These images are stored both at full resolution, as in the case of source image 605 and reference image 615, and are also stored in down-sampled (DS) form, as in the case of DS source image 610 and DS reference image 620. DS source image 610 and DS reference image 620 are generated from source image 605 and reference image 615 respectively by down-sampler 625.

In order for the system to perform motion vector estimation the control unit accesses a down-sampled source image 610 in order to fill source buffer 635 with a down-sampled source block taken therefrom. Similarly control unit 630 accesses down-sampled reference image 620 to fill reference buffer 640 with a down-sampled reference frame portion taken therefrom. The contents of source buffer 635 are passed to search unit 645 which comprises cost function calculation unit 650, minimisation unit 655 and control unit 660. Parts of the content of reference buffer 640 are also passed via interpolator 670 to cost function calculator 650. Hence, the search unit 645 searches in the search window provided by reference buffer 640 for the position in which the contents of the source buffer 635 best fits. As was described with reference to FIG. 3, in one embodiment a 2×2 configuration of source blocks is retrieved from memory together, in order to perform a parallel search, but for clarity in the embodiment illustrated in FIG. 6 only one source block is retrieved at a time. As was described with reference to FIG. 4A, this search is initially performed with reference to a predetermined set of points in this search window. In this situation the interpolator 670 merely passes a set of 4×4 pixels to the cost function calculator 650, which the cost calculator 650 then compares with the 4×4 down-sampled pixels contained in source buffer 635. This comparison is performed by means of calculating a cost function, which in this embodiment is performed by calculating the Sum of Absolute Differences between each set of 4×4 pixels. In addition, the cost function value calculated by the cost function calculator further includes a motion vector penalty value which represents the cost (in terms of encoding space) of encoding a motion vector describing the current position under investigation in the reference buffer. For example a long motion vector (representing greater movement between the source block and the target block in the reference frame) may require greater encoding space than a shorter motion vector. In any regard, in this embodiment the estimate motion vector is constrained to have a maximum length of 64 pixels.

When the cost function has thus been calculated for each of the predetermined set of positions in the reference buffer search window, the minimisation unit 655 then selects the position which represents the lowest value of the cost function value. This information is then passed to control unit 660 which controls interpolator 670 to interpolate between down-sampled pixels of the down-sampled reference frame portion stored in reference buffer 640 in order to generate a set of interpolated down-sampled reference frame blocks each of which is then passed to cost function calculator 650 in turn for comparison with the contents of source buffer 635. The set of interpolated down-sampled reference frame blocks generated by interpolator 670 are those in the immediate vicinity of the point in the search window previously found by minimisation unit 655 to have the lowest cost function value. Thus an iterative process can be performed in which the minimisation unit finds the lowest cost function value from amongst a set of points, the interpolator 670 then generates interpolated down-sampled reference frame blocks in the immediate vicinity of that point, the cost function calculator 650 calculates the cost function value associated with each of those blocks and the minimisation unit 655 selects the one with the lowest cost function value.

Figure 7:
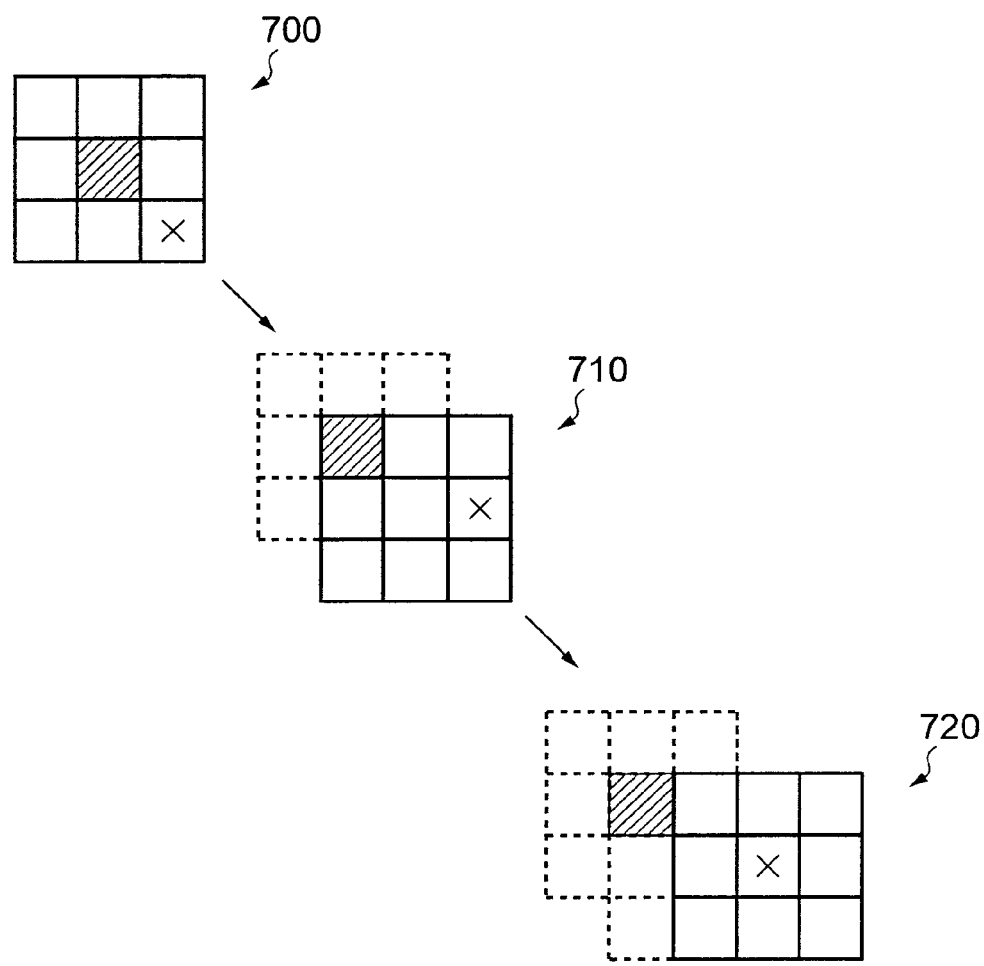
FIG. 7 schematically illustrates the iterative search for a cost function minimum.

This iterative process is schematically illustrated in FIG. 7. In this figure the squares each represent the central position of an interpolated block. At step 700, an original central position (hatched) represents the starting point, together with a set of interpolated down-sampled reference frame blocks immediately adjacent to that position (unhatched blocks). These are generated by the interpolator performing quarter down-sampled pixel interpolation, so these squares represent quarter pixel interpolations "up and left", "up", "up and right", "left", "right", "down and left", "down" and "down and right" with respect to the original position. Amongst these interpolated positions the minimisation unit has then selected the lower right ("down and right") position as having the lowest cost function value. Then at step 710 the interpolation unit generates a further set of interpolated down-sampled reference frame blocks in the immediate vicinity of this new lowest cost function value position (one of which (upper left) corresponds to the original position at the centre of step 700) and the minimisation circuit selects the block which results in the lowest cost function value. Finally, at step 720 the interpolation unit again generates a set of interpolated down-sampled reference frame blocks in the immediate vicinity of the position selected at the previous stage having the lowest cost function value, but now the position with the lowest cost function value remains the central point. Thus a local minimum of the cost function value has been found and the iterative process stops. The estimate motion vector generated is then generated with respect to this position.

In addition to calculating the cost function for a predetermined set of points (see FIG. 4) the search unit 645 also in parallel calculates the cost function for a null motion vector (i.e. representing no change in position between the source block and the reference frame) and also calculates the cost function value for the predicted motion vector (each source block has an associated predicted motion vector deriving from its neighbours) for the current source block. From each of these starting points the same iterative minimisation process (also known as a "descent") is also carried out, and the overall lowest cost function value from each of these three methods is then selected for the generation of the final estimate motion vector.

Figure 8A:
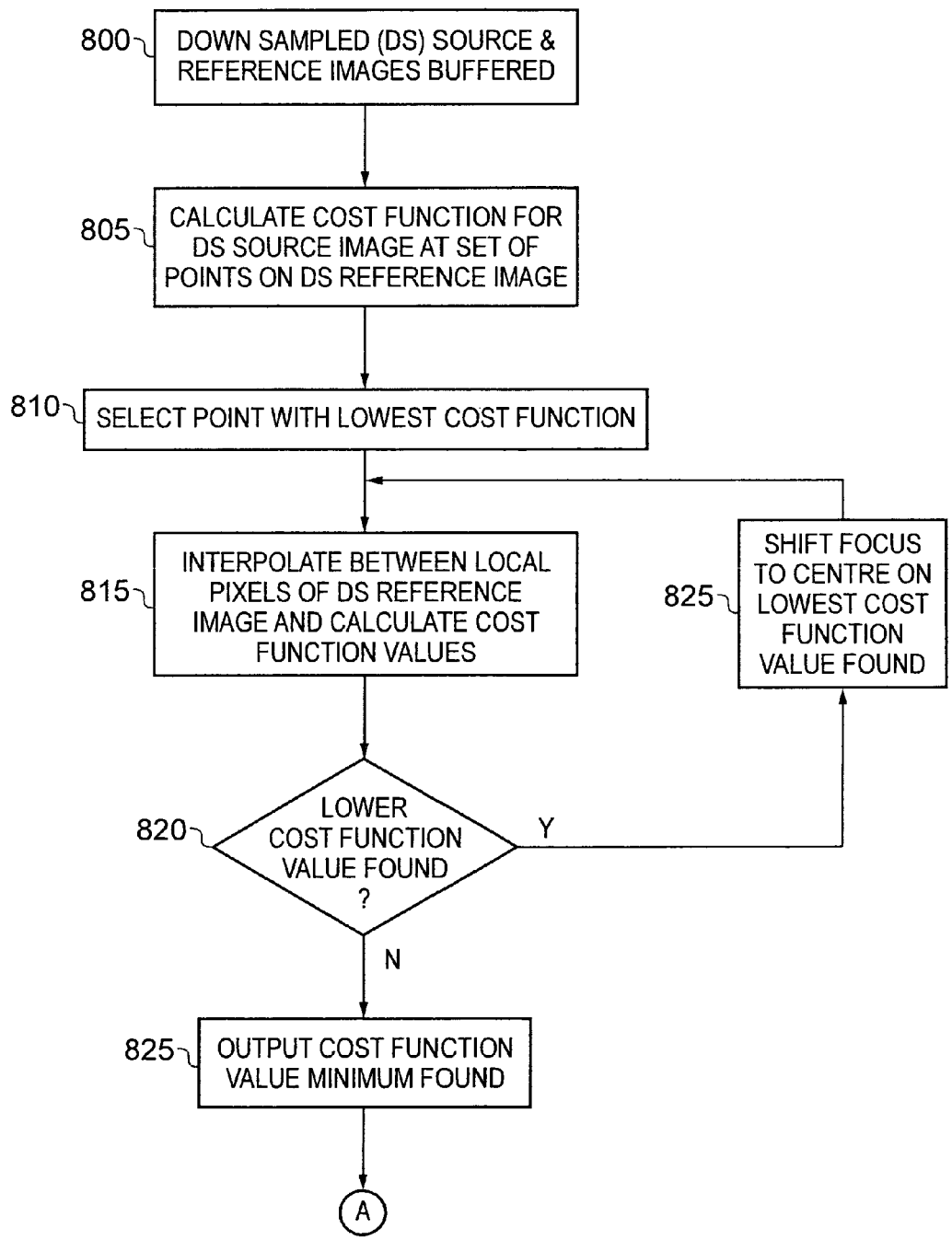
FIG. 8A schematically illustrates a series of steps performed in one embodiment.

The process of calculating a minimum cost function value according to these three strands is now discussed with reference to the flow diagrams in FIGS. 8A to 8D. In FIG. 8A the flow begins at step 800 where a down-sampled (DS) source and reference images are retrieved from external memory and locally buffered. At step 805 the cost function is calculated for the down-sampled source image at a predetermined set of points on the down-sampled reference image (those selected within the reference frame buffer) and at step 810 the point with the lowest cost function is identified. Then at step 815 interpolation on local pixels of the down-sampled reference image is performed and for each interpolated down-sampled reference frame block generated the cost function value is calculated. If a lower cost function value is thereby found to that previously found, then from step 820 the flow moves to step 825 where the focus of the process is shifted to centre on that new lowest cost function value found and the flow returns to step 815 where interpolation in that local region is carried out, followed by the calculation of the corresponding cost function values. If at step 820 a lower cost function value is not found, then the flow proceeds to step 825 where the lowest cost function value found is provided as an output.

Figure 8B:
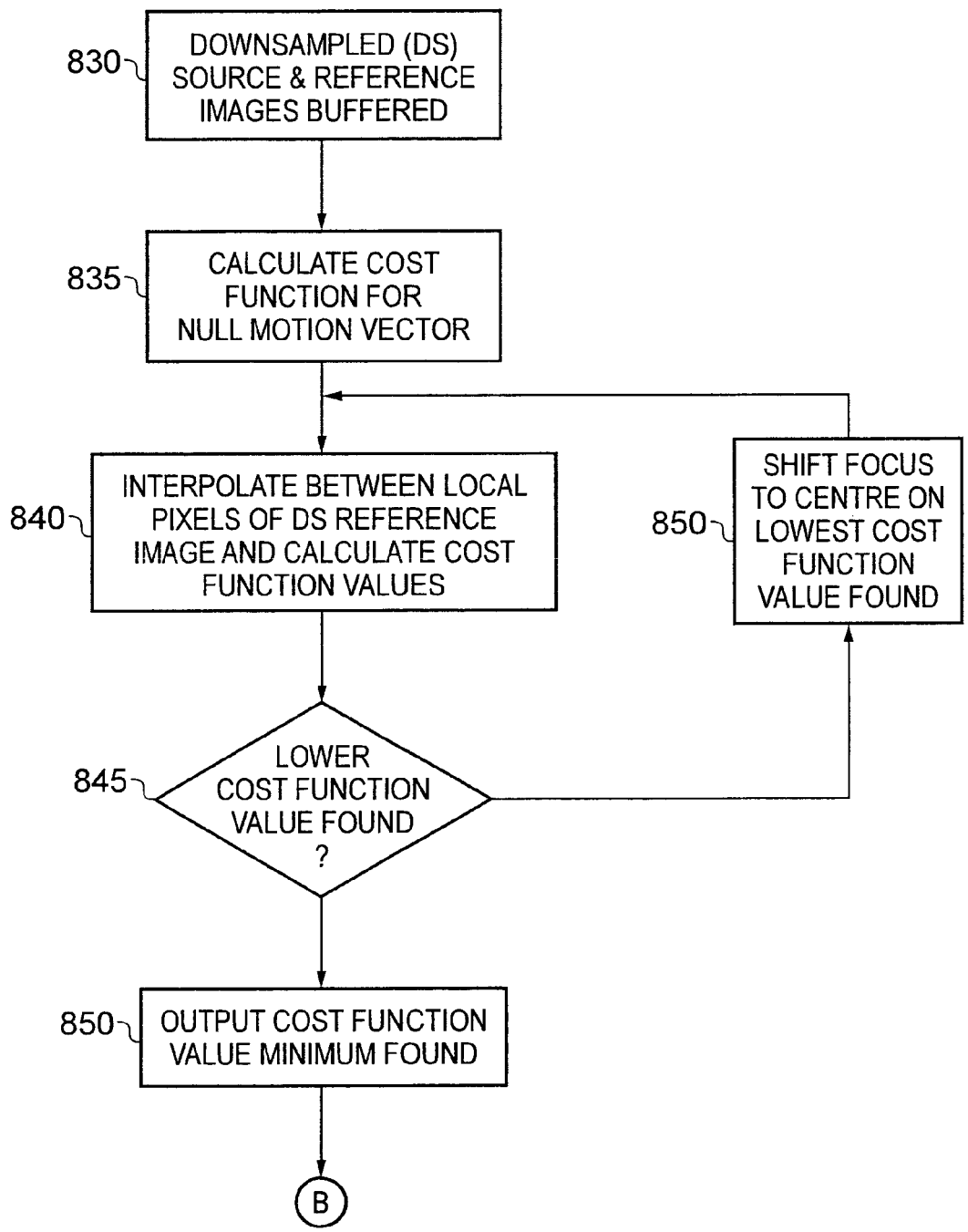
FIG. 8B schematically illustrates a series of steps performed in one embodiment.

Similarly in FIG. 8B the flow begins at step 830 where down-sampled source and reference images are buffered having been retrieved from the external memory. In this context the only portion of the reference image required is that which corresponds to a null motion vector of the source block. At step 835 the cost function for this null motion vector is calculated and at step 840 interpolation in the local region of that null motion vector is carried out, followed by the calculation of cost function values corresponding to the interpolated down-sampled reference frame blocks thus generated. At step 845 it is checked whether a lower cost function value has been found then that calculated for the null motion vector itself and if it has then the same iterative loop is started going via step 850 to shift the focus to centre on the lowest cost function value found, followed by interpolation and cost function value calculation at step 840. When no lower cost function value is found step 845, the flow concludes at step 850 where this lowest cost function value is provided as the output.

Figure 9:
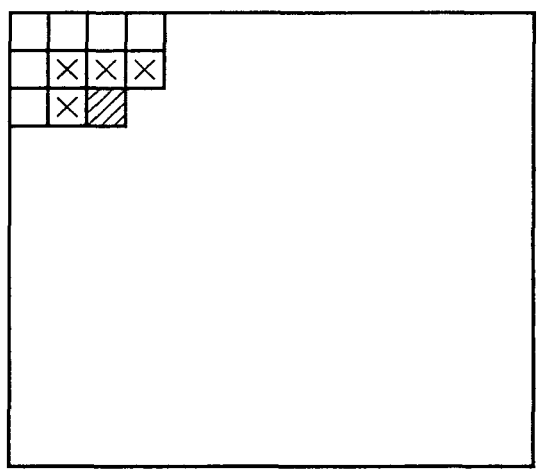
FIG. 9 schematically represents neighbouring blocks for a given source block and FIG. 10 schematically illustrates an example improvement in motion vector estimation.
Figure 8C:
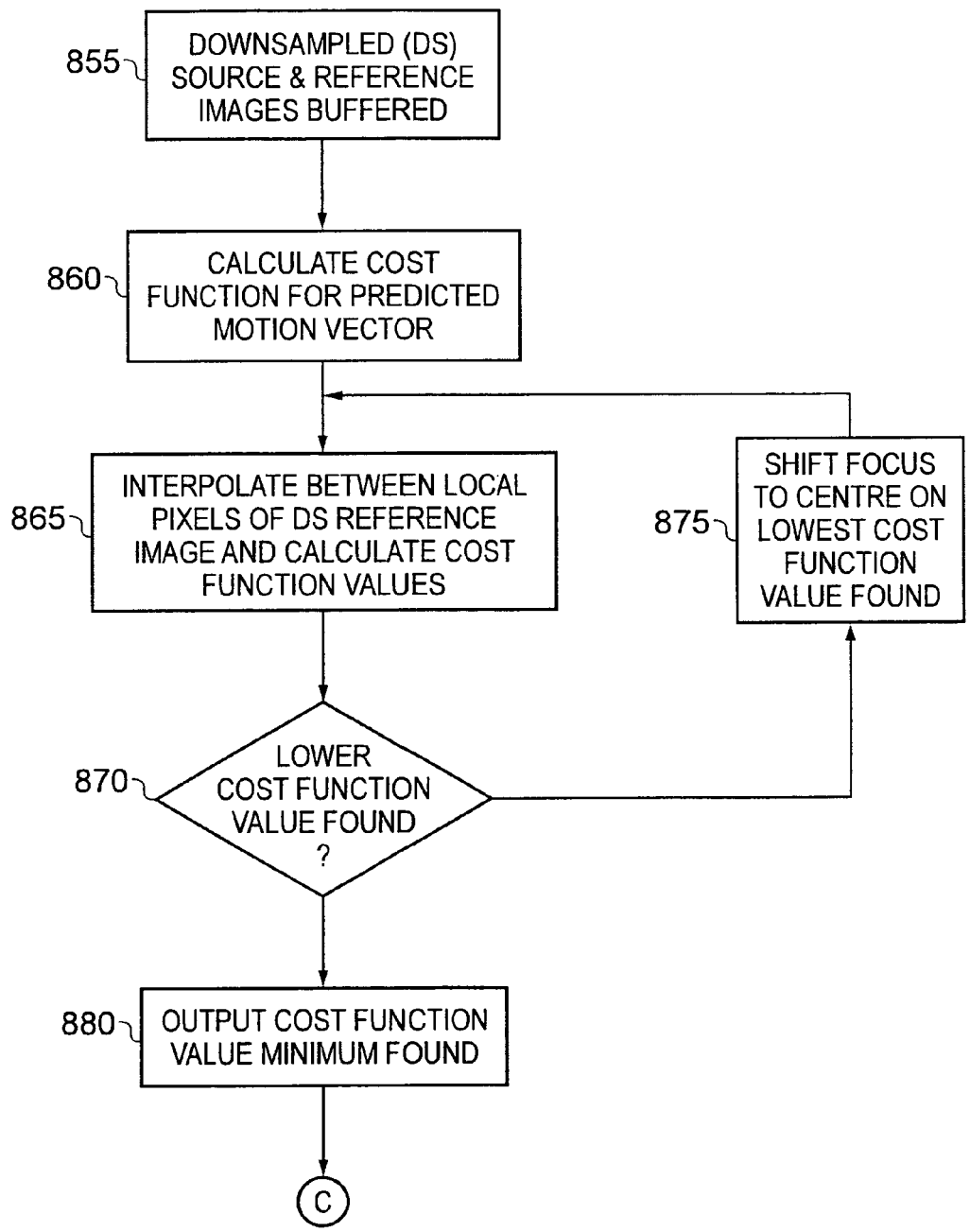
FIG. 8C schematically illustrates a series of steps performed in one embodiment.

Finally, in FIG. 8C, the flow similarly begins at step 855 by the down-sampled source and reference images being buffered. Here however at step 860 the cost function value is calculated for the predicted motion vector of the source block currently under consideration. This predicted motion vector is derived from the neighbouring source blocks as illustrated in FIG. 9—the predicted motion vector for the hatched source block is generated from the calculated motion vectors for the source blocks marked with crosses. This is then followed by the same iterative loop (of steps 865, 870 and 875, as described above with reference to FIGS. 8A and 8B. Finally, the cost function value minimum found is provided as an output at step 880.

Figure 8D:
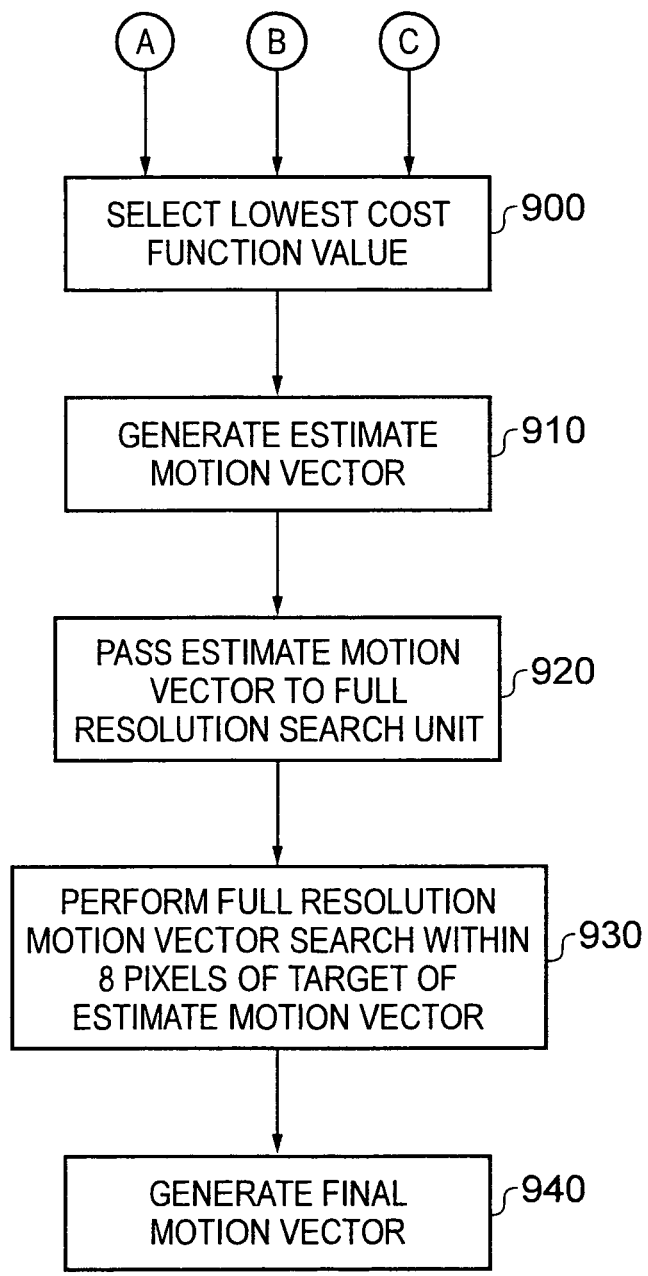
FIG. 8D schematically illustrates a series of steps performed in one embodiment.

The results of these three starting points for an iterative "descent" are then compared in the first step 900 of FIG. 8D. The lowest cost function value is selected and at step 910 an estimate motion vector is generated corresponding to the position at which this lowest cost function value is found. This estimate motion vector at step 920 is then passed to the full resolution search unit (motion vector generation unit 110 in FIG. 1) in order to carry out a full resolution search. At step 930 this full resolution motion vector search is then carried out within 8 pixels of the target of the estimate motion vector. At step 940 the final motion vector is generated.

Figure 10:
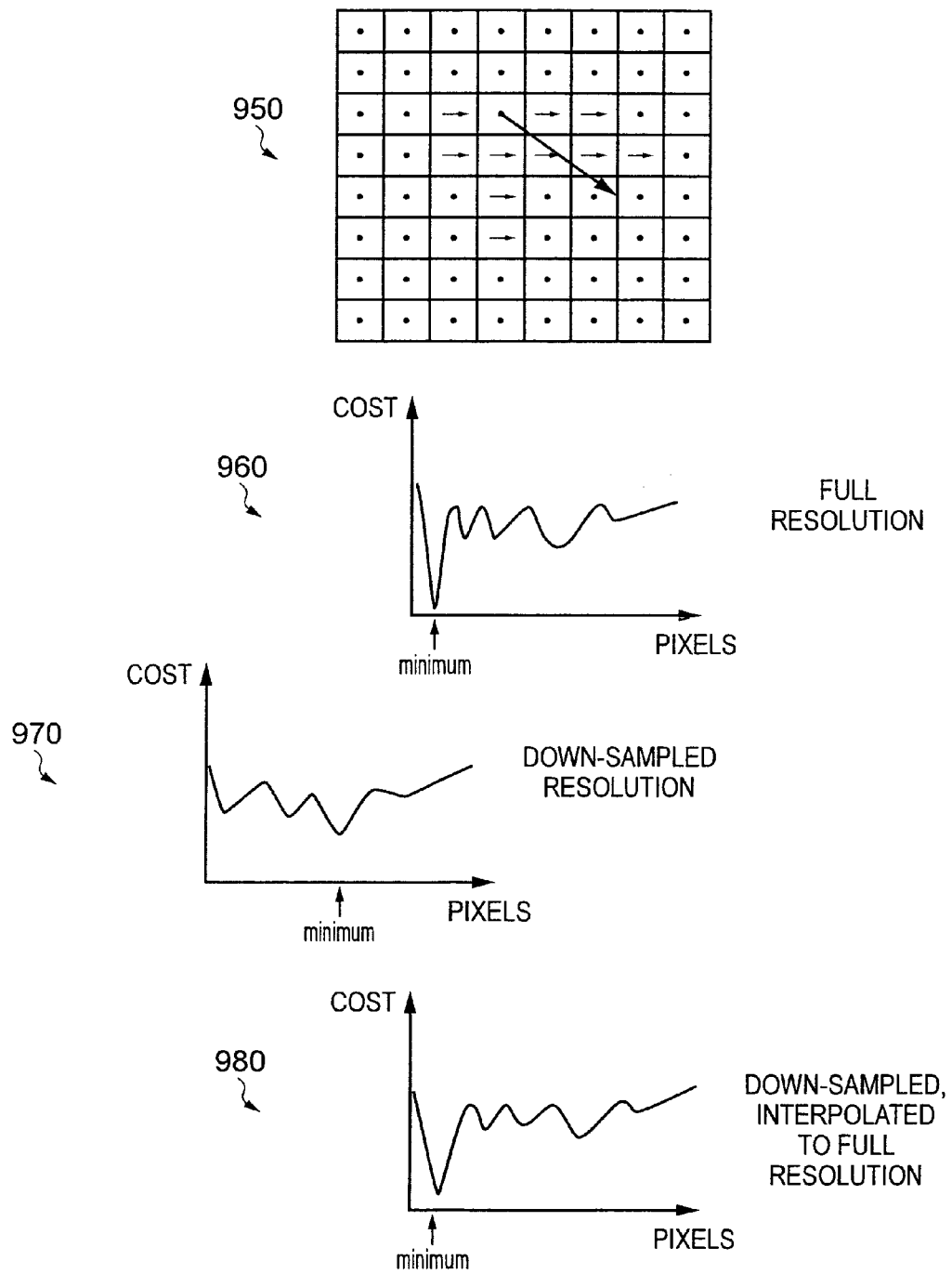

FIG. 10 schematically illustrates the benefits of the present invention. Generally labelled as 950 is an 8×8 set of blocks each annotated with their calculated motion vector. It can be seen that the peripheral blocks have null motion vectors (represented by a dot), whilst in the central region of the set of blocks there is a subset of blocks each of which has motion vectors pointing to the right. This could for example correspond to an object in the field of view moving to the right against a stationary background. However, it can also be seen that the motion vector for one block is unusually long and at a different angle to the other motion vectors. This has resulted from the estimate motion vector calculation process miscalculating the estimate motion vector because of the lower resolution of the down-sampled images used. The reason for this will become apparent from the cost function value graphs calculated for this block and illustrated at 960, 970 and 980.

The cost function graph illustrated at 960 is the cost function calculated for this block at full resolution. Here it can be seen that the lowest value of this cost function occurs at the tip of the sharp valley on the left of the distribution, i.e. at a small number of pixels and corresponding to a short motion vector such as the majority of the blocks in 950 have.

However, it can be seen in the cost function graph at 970, which is generated from a down-sampled resolution source block and reference frame that the down-sampling has lost the high frequency feature on the left of the graph, and now the minimum has been identified elsewhere, namely at a longer length of motion vector (as illustrated in 950).

The advantage of interpolating the down-sampled reference frame portion can be seen in 980, where the minimum is once again found corresponding to a short motion vector, in approximately the same place as the minimum for the distribution in 960. Thus, the minimum in 980 represents a more promising starting point for a limited range search at full resolution.

Thus, according to the techniques of the present invention, the bandwidth advantages of performing motion vector estimation on a down-sampled source block and reference frame portion are gained, yet by interpolating between pixels of the down-sampled reference frame portion the minimum of the cost function value may be more accurately identified, and thus provide a better starting point for a limited range full resolution search.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus configured to receive a down-sampled source block generated from a source frame and to receive a down-sampled reference frame portion generated from a reference frame, said reference frame and said source frame being taken from a sequence of video frames, said data processing apparatus comprising:

interpolation circuitry configured to interpolate between pixels of said down-sampled reference frame portion to generate a set of interpolated down-sampled reference frame blocks;

cost function calculation circuitry configured to calculate a cost function value indicative of a difference between said down-sampled source block and each of said set of interpolated down-sampled reference frame blocks;

minimisation circuitry configured to select an interpolated down-sampled reference frame block which corresponds to a minimum of said cost function value; and estimate motion vector generation circuitry configured to generate an estimate motion vector in dependence on said interpolated down-sampled reference frame block selected by said minimisation circuitry, wherein said cost function calculation circuitry and said minimisation circuitry are configured to iteratively select said set of interpolated down-sampled reference frame blocks to find a local minimum of said cost function value.

2. A data processing apparatus as claimed in claim 1, further comprising down-sampling circuitry configured to generate said down-sampled source block and said down-sampled reference frame portion.

3. A data processing apparatus as claimed in claim 1, further comprising motion vector generation circuitry configured to receive as an input said estimate motion vector and to generate from said source image and said reference image a result motion vector, said result motion vector being constrained to be within a predetermined range of said estimate motion vector.

4. A data processing apparatus as claimed in claim 1, wherein said set of interpolated down-sampled reference frame blocks is determined with reference to a predetermined set of points in said down-sampled reference frame portion.

5. A data processing apparatus as claimed in claim 4, wherein said predetermined set of points are separated by half of a block width.

6. A data processing apparatus as claimed in claim 1, wherein said set of interpolated down-sampled reference frame blocks is determined with reference to a null motion vector.

7. A data processing apparatus as claimed in claim 1, wherein said set of interpolated down-sampled reference frame blocks is determined with reference to at least one predetermined motion vector of at least one neighbouring source block.

8. A data processing apparatus as claimed in claim 7, wherein said at least one predetermined motion vector is a predicted motion vector for said down-sampled source block.

9. A data processing apparatus as claimed in claim 1, wherein said down-sampled reference frame portion is approximately an order of magnitude larger than said down-sampled source block.

10. A data processing apparatus as claimed in claim 1, wherein said down-sampled source block comprises a subset of pixels from said source image.

11. A data processing apparatus as claimed in claim 1, wherein said down-sampled reference frame portion comprises a subset of pixels from said reference image.

12. A data processing apparatus as claimed in claim 1, wherein said down-sampled source block comprises a filtered version of a block of said source image.

13. A data processing apparatus as claimed in claim 12, wherein each pixel of said down-sampled source block is generated by averaging over a set of pixels of said source image.

14. A data processing apparatus as claimed in claim 1, wherein said down-sampled reference frame portion comprises a filtered version of a block of said reference image.

15. A data processing apparatus as claimed in claim 14, wherein each pixel of said down-sampled reference frame portion is generated by averaging over a set of pixels of said reference image.

16. A data processing apparatus as claimed in claim 1, wherein said interpolation circuitry is configured to perform ¼ pixel interpolation.

17. A data processing apparatus as claimed in claim 1, wherein said estimate motion vector is constrained to have a maximum length of 64 pixels.

18. A data processing apparatus as claimed in claim 1, wherein said cost function value is calculated from a sum of absolute differences (SAD) between pixels of said down-sampled source block and pixels of each of said set of interpolated down-sampled reference frame blocks.

19. A data processing apparatus as claimed in claim 1, wherein said cost function value further comprises a motion vector penalty value.

20. A data processing apparatus as claimed in claim 1, wherein said cost function value is calculated based on one of a sum of absolute transformed difference (SATD) algorithm, a sum of square error (SSE) algorithm, a mean square error (MSE) algorithm, a mean absolute error (MAE) algorithm, and a mean absolute difference (MAD) algorithm.

21. A method of generating an estimate motion vector for video encoding comprising the steps of:

receiving a down-sampled source block generated from a source frame and receiving a down-sampled reference frame portion generated from a reference frame, said reference frame and said source frame being taken from a sequence of video frames;

interpolating, by interpolating apparatus, between pixels of said down-sampled reference frame portion to generate a set of interpolated down-sampled reference frame blocks;

calculating, by one or more data processors, a cost function value indicative of a difference between said down-sampled source block and each of said set of interpolated down-sampled reference frame blocks;

selecting an interpolated down-sampled reference frame block which corresponds to a minimum of said cost function value; and generating an estimate motion vector in dependence on said interpolated down-sampled reference frame block selected by said minimisation circuitry, wherein calculating and selecting steps are performed to iteratively select said set of interpolated down-sampled reference frame blocks to find a local minimum of said cost function value.

22. A data processing apparatus configured to receive a down-sampled source block generated from a source frame and to receive a down-sampled reference frame portion generated from a reference frame, said reference frame and said source frame being taken from a sequence of video frames, said data processing apparatus comprising:

interpolation means for interpolating between pixels of said down-sampled reference frame portion to generate a set of interpolated down-sampled reference frame blocks;

cost function calculation means for calculating a cost function value indicative of a difference between said down-sampled source block and each of said set of interpolated down-sampled reference frame blocks;

minimisation means for selecting an interpolated down-sampled reference frame block which corresponds to a minimum of said cost function value; and estimate motion vector generation means for generating an estimate motion vector in dependence on said interpolated down-sampled reference frame block selected by said minimisation means, wherein said cost function calculation means and said minimisation means are configured to iteratively select said set of in interpolated down-sampled reference frame blocks to find a local minimum of said cost function value.

* * * * *